(12) United States Patent
Raj et al.

(10) Patent No.: US 11,254,615 B2
(45) Date of Patent: Feb. 22, 2022

(54) FLASH-SINTERING METHOD FOR FORMING INTERFACE LAYER

(71) Applicant: The Regents of the University of Colorado, Denver, CO (US)

(72) Inventors: Rishi Raj, Boulder, CO (US); Niriaina Andriamady, Boulder, CO (US); Thomas Clemenceau, Boulder, CO (US); Shikhar Jha, Pittsburgh, PA (US)

(73) Assignee: The Regents of the University of Colorado, Denver, CO (US)

( * ) Notice: Subject to any disclaimer, the term of this patent is extended or adjusted under 35 U.S.C. 154(b) by 14 days.

(21) Appl. No.: 16/136,063

(22) Filed: Sep. 19, 2018

(65) Prior Publication Data
US 2020/0087211 A1   Mar. 19, 2020

(51) Int. Cl.
*C04B 35/486* (2006.01)
*C04B 35/111* (2006.01)
*C04B 35/64* (2006.01)
*H01M 10/0525* (2010.01)
*H01M 10/0562* (2010.01)

(52) U.S. Cl.
CPC ......... *C04B 35/486* (2013.01); *C04B 35/111* (2013.01); *C04B 35/64* (2013.01); *H01M 10/0525* (2013.01); *H01M 10/0562* (2013.01); *C04B 2235/3203* (2013.01); *C04B 2235/3227* (2013.01); *C04B 2235/3244* (2013.01); *C04B 2235/5436* (2013.01); *C04B 2235/66* (2013.01)

(58) Field of Classification Search
CPC .......... H01M 10/0252; H01M 10/0562; C04B 35/486; C04B 35/111; C04B 35/64
USPC ...................................................... 429/322
See application file for complete search history.

(56) References Cited

U.S. PATENT DOCUMENTS

| 2014/0306381 | A1* | 10/2014 | Raj ........................ | C04B 35/645 |
| | | | | 264/414 |
| 2016/0308243 | A1* | 10/2016 | Herle ..................... | H01M 4/134 |
| 2018/0301751 | A1* | 10/2018 | Sakamoto ......... | H01M 10/0562 |
| 2020/0087210 | A1* | 3/2020 | Raj ...................... | H01M 10/052 |

OTHER PUBLICATIONS

Xia et al., Reversible flash-bonding of zirconia and nickel alloys, May 2018, Scripta Materialia, 153, 31-34 (Year: 2018).*
Yang et al., Wettability, interfacial phenomena and shear strength for Al/ZrO$_2$ joining system driven by direct current, Feb. 2015, Superlattices and Microstructures, 82, 158-164 (Year: 2015).*
Francis et al., Flash sintering of Anode-Electrolyte Multilayers for SOFC Applications, 2013, Journal of the American Ceramic Society, 96, 1352-1354 (Year: 2013).*

(Continued)

*Primary Examiner* — Sean P Cullen
(74) *Attorney, Agent, or Firm* — Snell & Wilmer L.L.P (57) ABSTRACT

Methods of forming structures including a substrate (e.g., ceramic) and an interface layer comprising a metal are disclosed. Structures and electrochemical cells and batteries are also disclosed. Exemplary methods include flash sintering of metal and ceramic materials. Various structures may be suitable for use as solid electrolytes in solid-state electrochemical cells, as well as for many other applications.

13 Claims, 10 Drawing Sheets

(56) References Cited

OTHER PUBLICATIONS

Cologna et al., Flash Sintering of Nanograin Zirconia in <5 at 850° C., 2010, Journal of the American Ceramic Society, 93, 3556-3559 (Year: 2010).*

Cologna et al., Flash-Sintering of Cubic Yttria-Stabilized Zirconia at 750° C. for Possible Use in SOFC Manufacturing, 2011, Journal of the American Ceramic Society, 94, 316-319 (Year: 2011).*

* cited by examiner

FLASH-SINTERING METHOD FOR FORMING INTERFACE LAYER

STATEMENT REGARDING FEDERALLY-SPONSORED RESEARCH OR DEVELOPMENT

This invention was made with government support under grant number DE-AR0000777 awarded by ARPA-E and grant number N00014-15-1-2401 awarded by ONR. The government has certain rights in the invention.

CROSS-REFERENCE TO RELATED APPLICATIONS

This application is filed concurrently with U.S. application Ser. No. 16/136,043 entitled "METHOD OF FORMING A SINTERED COMPOUND AND COMPOUND FORMED USING THE METHOD," and filed Sep. 19, 2018, and U.S. application Ser. No. 16/136,054, entitled "FLASH-SINTERED COMPOSITE MATERIALS AND METHODS OF FORMING SAME," and filed Sep. 19, 2018, the contents of which are hereby incorporated herein by reference.

FIELD OF THE DISCLOSURE

The present disclosure generally relates to sintering methods. More particularly, the disclosure relates to methods of flash sintering and to structures formed using flash sintering.

BACKGROUND OF THE DISCLOSURE

Ceramic materials are used in a wide variety of electronic applications, such as semiconductor devices, microelectromechanical devices, and in energy storage devices, such as electrochemical cells and batteries. In many such applications, it may be desirable to form low-resistance electrical contact to the ceramic materials. However, many ceramic materials may be characterized as having surfaces that are difficult to "wet" with a metal layer, and therefore forming low-resistance electrical contact to such materials may be difficult.

In the case of electrochemical cells, ceramic materials, such as LLZO (Li7La3Zr2O12) have shown promise as solid electrolyte material to enable development of safer, higher energy density lithium-ion batteries. However, poor contact resistance to one or more surfaces of solid-state electrolyte has been a challenging design consideration. For example, a contact resistance between a lithium metal anode and the solid state electrolyte (e.g., LLZO) often limits the overall resistance of the electrochemical cell. The area specific resistance (ASR, $\Omega cm^2$) of the interface can be much greater than of the electrolyte.

Accordingly, improved methods of forming structures, such as structures including ceramic materials, and improved structures having favored properties, such as lower contact resistance, are desired.

SUMMARY OF THE DISCLOSURE

This summary is provided to introduce a selection of concepts in a simplified form. These concepts are described in further detail in the detailed description of example embodiments of the disclosure below. This summary is not intended to necessarily identify key features or essential features of the claimed subject matter, nor is it intended to be used to limit the scope of the claimed subject matter.

Various embodiments of the present disclosure relate to methods of forming a structure that includes an interface layer, to a structure including the interface layer, and to devices, such as electrochemical cells and batteries including the structure. The interface layer can provide a variety of desired properties, such as (i) lower contact resistance between a metal layer and a ceramic material, (ii) enhanced device reliability, and (iii) stabilization of electrical properties of the devices, compared to similar structures and devices that do not include such interface layers.

In accordance with at least one embodiment of the disclosure, a method of forming a structure comprises providing a ceramic material, depositing a layer of metal on the ceramic material to form a coated ceramic material, and exposing the coated ceramic material to a flash sintering process to form the structure comprising the interface layer. The ceramic material can include, for example, lithium. By way of particular example, the ceramic material can include lithium lanthanum zirconium oxide (e.g., $Li_7La_3Zr_2O_{12}$). In accordance with various aspects of these embodiments, during the step of exposing, an electric field of about 10 V/cm to about 1000 V/cm is applied to the coated ceramic martial. A reaction chamber temperature during the step of exposing the coated ceramic material to a flash sintering process can be increased at a rate from between about 1° C./minute and about 100° C./minute. The flash sintering can occur at a temperature of about 200° C. and about 300° C., about 400° C. to about 500° C., about 300° C. to about 1000° C. or about 600° C. to about 1000° C. The metal can be or include, for example, silver, tin, aluminum, or titanium. A thickness of the metal layer after the step of exposing the coated ceramic material to a flash sintering process to form the structure comprising the interface layer can range from about one monolayer to about 5 micrometers. The metal layer can be continuous or discontinuous. The step of depositing can include application of metal beads from paste, sputtering, and the like.

In accordance with further exemplary embodiments of the disclosure, a method of forming an electrochemical cell includes providing a structure as described herein. The method can further include forming an anode on one side of the structure and/or forming a cathode on another side of the structure.

In accordance with yet further exemplary embodiments of the disclosure, an electrochemical cell includes an anode, a solid-state electrolyte having an interface layer formed by (e.g., flash) sintering, and a cathode. The anode can be or include lithium metal. The electrolyte can be or include any of the ceramic materials described herein. The cathode can include, for example, lithium cobalt oxide. A thickness of the interface layer ranges from about one monolayer to about five micrometers. The interface layer can be or include, for example, tin, silver, aluminum or titanium.

In accordance with yet additional embodiments of the disclosure, a battery includes an electrochemical cell as described herein. The battery can additionally include one or more of an anode current collector, a cathode current collector, and a housing.

BRIEF DESCRIPTION OF THE DRAWING FIGURES

A more complete understanding of exemplary embodiments of the present disclosure can be derived by referring to the detailed description and claims when considered in connection with the following illustrative figures.

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

The present disclosure generally relates to methods of forming structures including an interface layer and to cells and devices, such as batteries, that include such structures. Exemplary methods include providing (e.g., forming) a ceramic material, depositing a layer of metal on the ceramic material to form a coated ceramic material, and exposing the coated ceramic material to a flash sintering process to form the structure comprising the interface layer. Exemplary embodiments of the disclosure also relate to the structures and to electrochemical cells and batteries including the structures.

As set forth in more detail below, methods described herein can be used for a wide variety of applications, in which, for example, it is desirable to form electrical contact to a ceramic material. Metal-ceramic interfaces are usually characterized by poor "wetting." Methods as described herein use flash sintering to reduce a contact angle between the metal and the ceramic, thereby causing the metal to spread on a ceramic surface. In the case of electrochemical cells, a metal (e.g., silver) dispersed on a ceramic (e.g., LLZO) surface (i) lowers the electrochemical contact resistance between Li-metal and LLZO by an order of magnitude, (ii) greatly enhances reliability and reproducibility of the electrochemical performance, and (iii) stabilizes the DC response of a Li|LLZO|Li cell over more than 50 back-and-forth cycles. Various examples provided below relate to ceramic materials that are used as solid-state electrolytes in electrochemical cells. However, unless otherwise specified, the invention is not limited to such examples.

Generally, flash sintering can be performed in a variety of ways, including applying a voltage to a sample in, e.g., an isothermal furnace, and switching to current control upon the incidence of flash; applying a voltage and heating the furnace at increasing temperature (e.g., increasing temperature at or approximate (e.g., plus or minus about ten percent) at a constant rate) until the onset of the flash; and applying (e.g., proximately isothermal) furnace temperature and increasing the current—e.g., increasing current at or approximately at a constant rate from the very start, without using voltage control. In the latter case, current rates can be varied from, for example, about 50 mA min-1 to 5000 mA min-1, or about 100 mA mm-2. When ramping temperature, the temperature within a reaction chamber can ramped up at a rate between about 1° C./minute to about 100° C./minute (e.g., at or near a constant rate of increasing temperature) and/or to a temperature of about 300° C. to about 1200° C. The following comparisons of current rate to the voltage-to-current experiments are noted (i) in both instances the onset of the flash is signaled by an unusual rise in conductivity; however if the power supply remains in the current control mode, the increase in conductivity is manifested by a drop in the voltage generated across the specimen, (ii) the black body radiation model is modified to include the energy absorbed in specific heat, in order to determine the time dependent change in temperature as the current is increased—this correction is particularly significant at the very high current rates, (iii) sintering occurs continuously, reaching full density, in most or all instances, when the current density reaches ~100 mA mm-2, and (iv) it is suggested that the current rate experiments yield fine-grained microstructure across the entire gage section of the dog-bone specimen, presumably because the highly transient conditions of voltage-to-current flash experiments are sidestepped. Exemplary apparatus and techniques for flash sintering other materials are disclosed in U.S. Pat. No. 8,940,220, issued on Jan. 27, 2015, in the name of Raj et al. and U.S. Pat. No. 9,334,194, issued on May 10, 2016, in the name of Raj et al., the contents of both of which are hereby incorporated herein by reference to the extent such contents do not conflict with the present disclosure.

Flash sintering generally initiates when a ceramic is heated to a temperature in the range of about 300° C. to about 1000° C. in the presence of an electric field in the range of about 10 V cm-1 to about 300 V cm-1, applied across the specimen. During flash sintering, there is often a non-linear rise in conductivity, and the specimen becomes electroluminescent. Solid-state (chemical) diffusion is greatly accelerated, compared to traditional sintering processes, and this can produce sintering in mere seconds (e.g., 0.5 to about 10 or about 1 to about 5 or about 2 to about 3 seconds). Flash-sintering has great generality and can be applied to various classes of ceramics, including semiconductors, ionic conductors, electronic conductors, and insulators. Flash sintering as described herein can produce fully sintered polycrystals and/or single crystals.

Flash sintering can also induce unusual phase transformations that lie outside the standard regimes of equilibrium phase diagrams. As set forth in more detail below, flash sintering can also induce nearly perfect wetting of a ceramic surface with a metal. This may be considered as an example of a non-equilibrium phenomenon induced by flash sintering, since metals are known to bond poorly with ceramics.

In solid-state lithium ion batteries, the contact resistance between lithium metal, the anode, and the solid state electrolyte, such as LLZO, often limits the overall resistance of the cell. The area specific resistance (ASR, cm) of the interface can be much greater than of the electrolyte. A metal layer spread on the LLZO (the ceramic electrolyte) by flash sintering can reduce the contact ASR. In these cases, the metal can be chosen, such that the metal allows lithium metal atoms to diffuse through the metal to the LLZO interface. Silver can allow diffusion of lithium at ambient temperatures. Other metals such as tin may also work.

Figure 1:
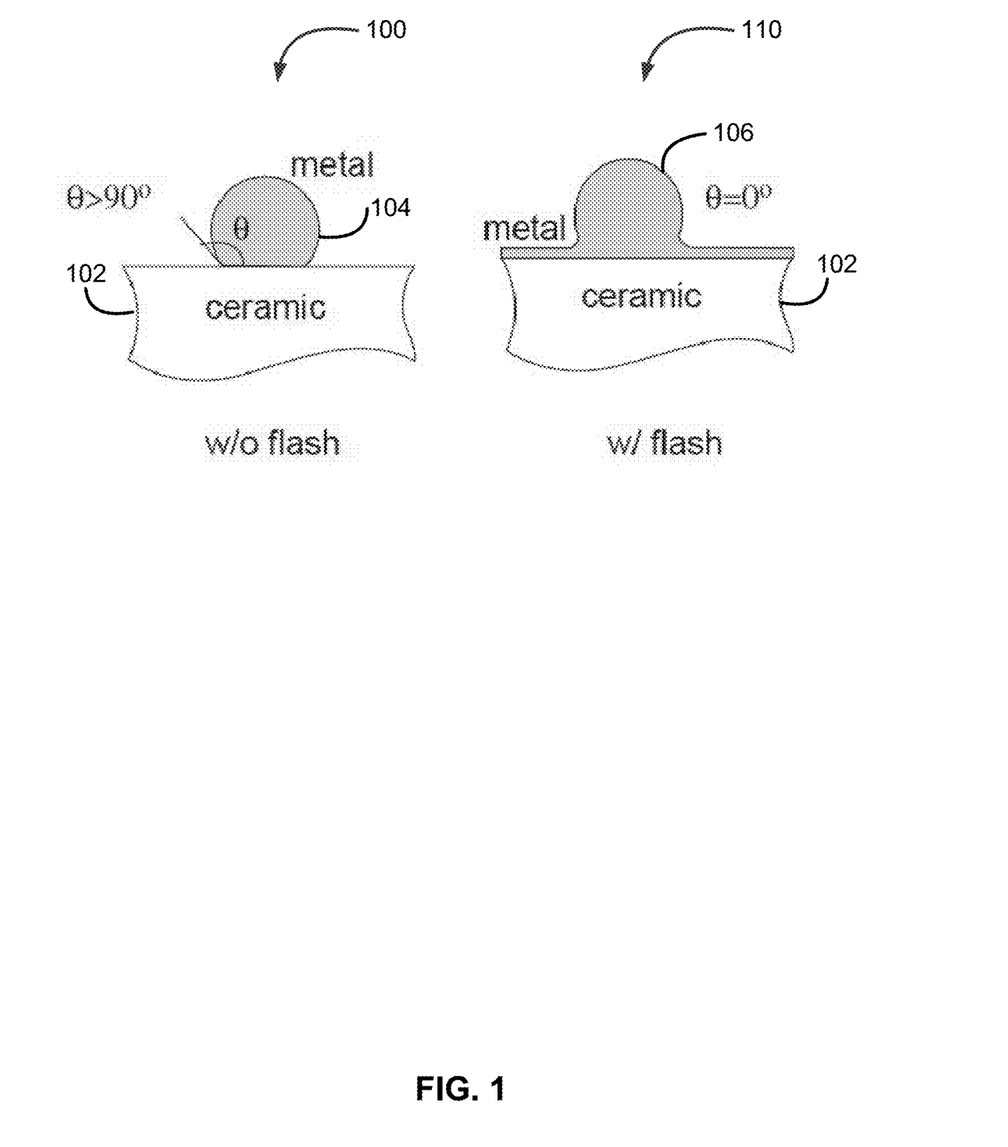
FIG. 1 illustrates a structure in accordance with at least one embodiment of the disclosure.

FIG. 1 illustrates a structure 100 before a flash sintering process and a structure 110 after a flash sintering process. As illustrated, structure 100 includes a ceramic substrate 102 and a metal bead 104 placed on a surface of the ceramic substrate 102. After flash sintering, an interface layer including the metal 106 is formed on a top surface of ceramic substrate 102.

SPECIFIC EXAMPLES

Example 1

The specific examples provided below illustrate techniques for forming structures, including an interface layer, in accordance with the present disclosure. Unless otherwise noted, the invention is not limited to any of these specific examples.

To form a structure including silver and 3YSZ, a few beads of silver (e.g., silver paste available from Sigma-Aldrich, St. Louis, Mo.) were placed onto the surface of a dense 3YSZ substrate (previously formed—e.g., by sintering or flash sintering) and the metal/substrate combination was flash sintered. During the flash sintering process, the silver metal spread on the surface of the ceramic, illustrated as structure 110 in FIG. 1.

In accordance with various examples, silver may be desirable to form an interface layer, because of its resistance to oxidation at high temperature, high electrical conductivity and a melting point higher than the nominal flash temperature of 3YSZ. The ceramic material/substrate can be dogbone shaped, and the substrates can be suspended in a furnace with platinum wires that also carry voltage and current to the specimen. A camera, with optical filters, placed at the bottom of the tube furnace can record changes in the specimen in real time at the rate of, for example, 10 Hz. The furnace can be held at a constant temperature of, for example, about 800° C. throughout the flash sintering process. Because the 3YSZ substrate was already dense, a nominal electric field of 50 V/cm was sufficient to induce the flash sintering, which is signaled by an abrupt rise in the conductivity of the specimen. When the current reached the limit the power supply was switched to current control for about five seconds. Under current control, the specimen can be held in a constant state of flash, also known as Stage III.

Figure 2:
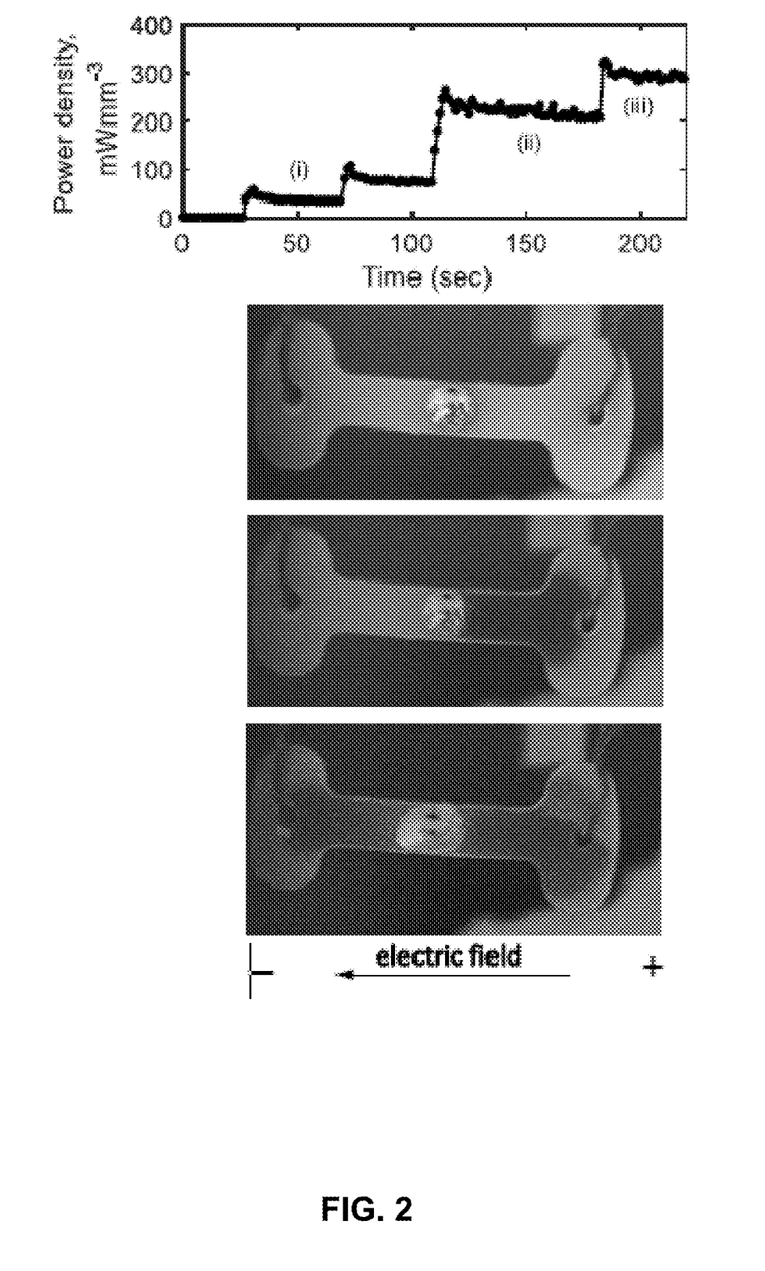
FIG. 2 illustrates formation of an interface layer in accordance with at least one embodiment of the disclosure.

The power sent through the specimen in Stage III was increased by stepwise increases in the current, until the silver was seen spread over the surface. The current limit was increased from 20 to 25, to 50 and finally to 75 mAmm$^2$. The power parameters of flash are illustrated in FIG. 2. The "spreading" of a silver layer, first towards the positive electrode, and then when the current density is increased further, over the entire specimen surface is shown in the optical micrographs taken with the camera. This behavior is shown schematically in FIG. 1. At the end of the flash sintering, the electric field was turned off and the specimen was cooled down.

The surface of the specimen was sputtered with gold and viewed under field emission scanning electron (JSM-7401F JEOL, Tokyo, Japan). Energy dispersive spectroscopy (EDS) confirmed that the surface layer consisted primarily of silver, with a small fraction of zirconium.

Example 2

Specimens of LLZO, with a density of 97%, were prepared by the flash sintering. An exemplary technique for forming LLZO by flash sintering is described in application Ser. No. 16/136,043, entitled METHOD OF FORMING A SINTERED COMPOUND AND COMPOUND FORMED USING THE METHOD. These specimens were used as a substrate for spreading silver layer on its surface. The reflash (spreading of metal on the surface of a ceramic) processes were carried out with the same procedure as used for flash sintering of LLZO from powders, for example, those set forth in the '043 application.

A suitable combination of an electric field and temperature for initiating the flash sintering was determined from constant heating rate experiments, where an electric field was applied and the furnace was heated at a constant rate—e.g., at a rate of about 1° C./min to about 10° C./min or about 1° C./min to about 100° C./min plus or minus about 10 percent. The temperature for the onset of flash is signaled by a rise in the conductivity of the structure. The processes were repeated with different applied fields. The results for the relationship between the electric field and the furnace temperature for the onset of flash of LLZO are illustrated in FIG. 3.

Figure 3:
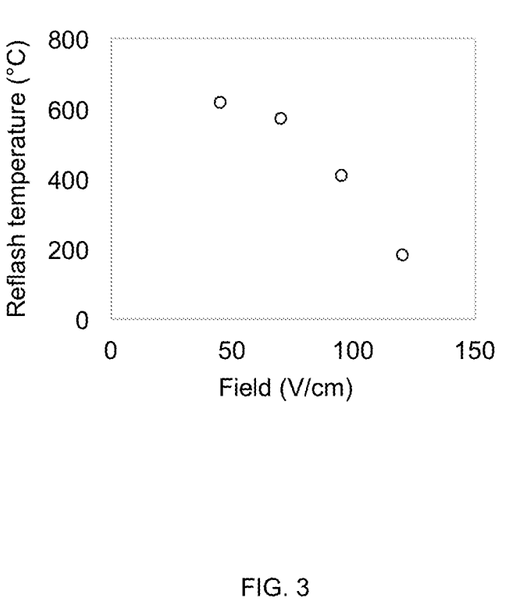
FIG. 3 illustrates onset of reflash temperature for different values of the applied field in accordance with at least one embodiment of the disclosure.
Figure 4:
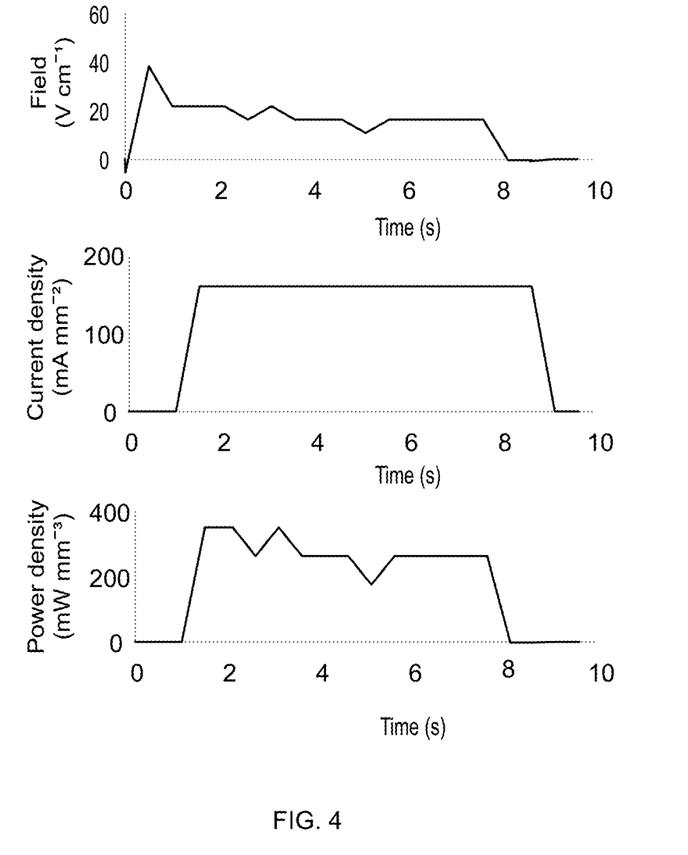
FIG. 4 illustrates electric field, current density, and power density curves while reflashing LLZO with silver in accordance with at least one embodiment of the disclosure.

The data in FIG. 3 were used to design the flash experiments for spreading silver on the surface of dense LLZO. These experiments were carried out with isothermal furnace conditions. A drop of silver conductive paste (Sigma-Aldrich, St. Louis, Mo.) was deposited at the center of the LLZO surface. The specimen was hung with wires, made from Kanthal; the wires also carried the electric field and current to the specimen. The furnace was held at a constant temperature of 650° C. A field of 50 V cm$^{-1}$ was applied as a step function. Flash was signaled by an abrupt rise in conductivity; the power supply was then switched (e.g., automatically) to current control set to a limit of 160 mA mm$^{-2}$. The curves for the electric field, the current density, and the power density are illustrated in FIG. 4. The whole process lasts less than 10s, 20s or 5s.

Figure 5:
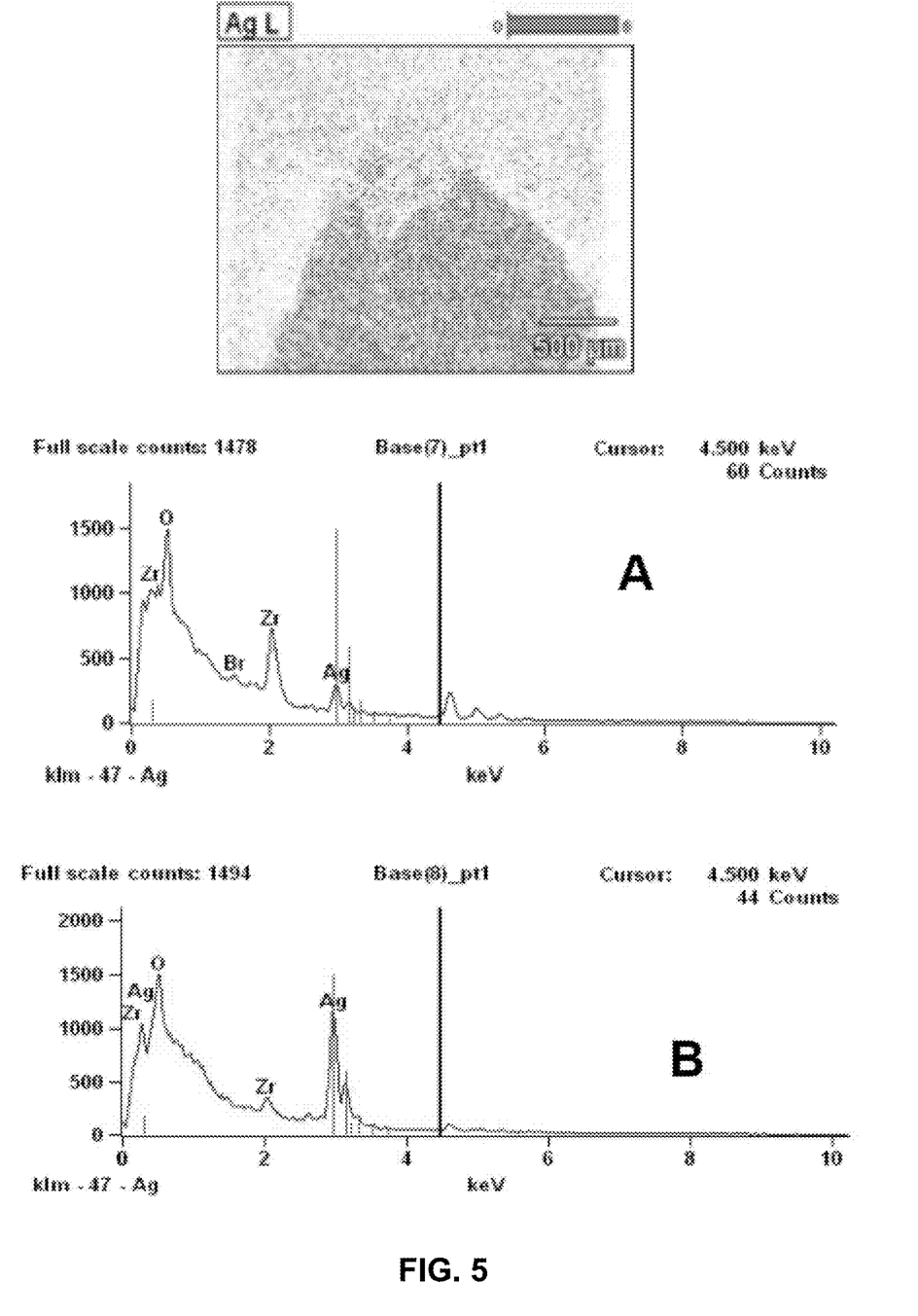
FIG. 5 illustrates EDS mapping of the surface of LLZO coated with silver in accordance with at least one embodiment of the disclosure. The area B is the location of a silver bead, while area A is where the metal has spread as a thin layer.

The spreading of silver on the LLZO surface was examined by energy-dispersive X-ray spectroscopy (EDS) in the scanning electron microscope. The mapping of silver of the particle of silver on the surface and the region just adjacent to it is illustrated in FIG. 5.

Example 3

Half cells with the Li|Ag|LLZO|Ag|Li architecture were assembled. Interfacial contact resistance was measured with an impedance analyzer (4192A LF impedance analyzer; HP, Palo Alto, Calif.) in the frequency range of 5 Hz to 10 MHz with a voltage amplitude at 0.1 V. Zview software was employed for data analysis and presentation of the impedance spectrum. Direct current (DC) experiments were also performed using a multichannel Arbin programmed by MITS Pro software. The results are reported as area specific resistance (ASR) values in units of Ω cm2.

Figure 6:
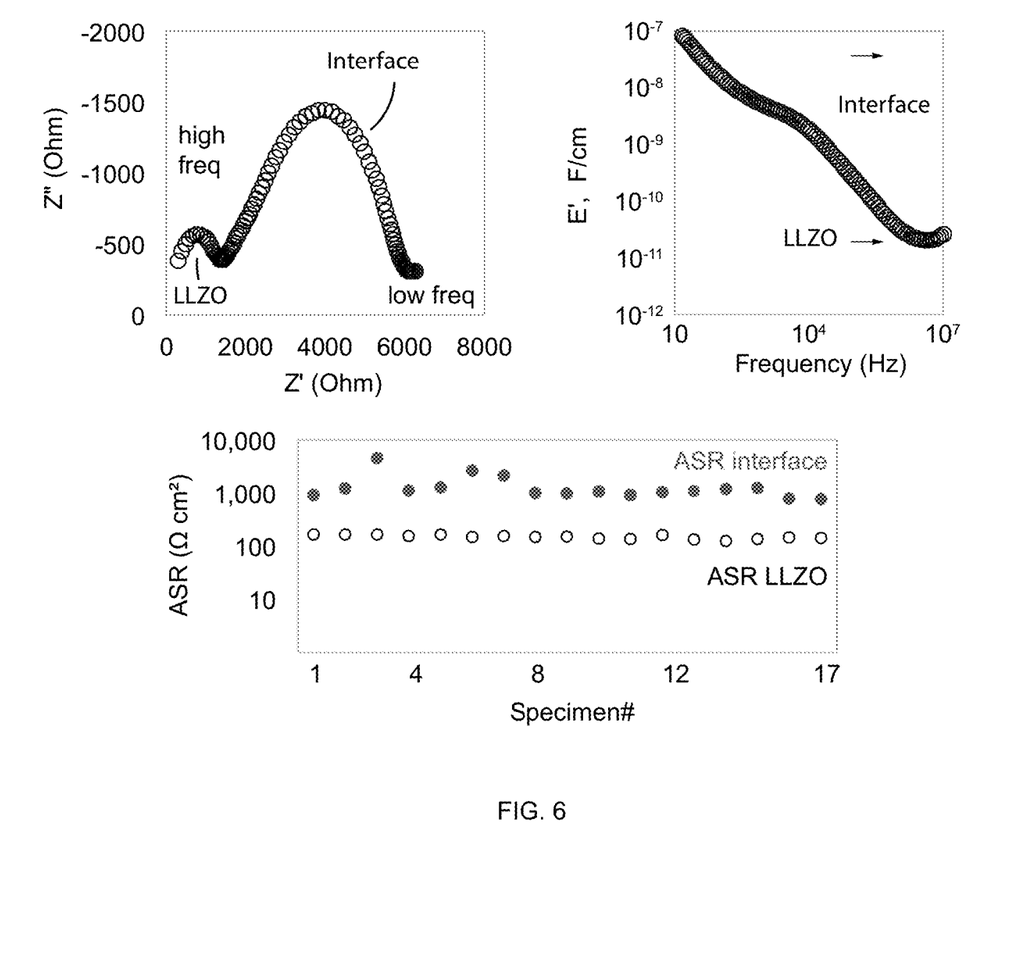
FIG. 6 illustrates complex impedance measurements of the bulk and interface ASR for several specimens measured at room temperature in accordance with at least one embodiment of the disclosure.

The results from impedance measurements of bulk and interface ASR values for seventeen samples are illustrated in FIG. 6. Typical examples of the Nyquist plot and the capacitance plot for the half cells are shown in the upper half of the figure. The ASR for the LLZO electrolyte remained at ~130 Ωcm2, the same as measured in the earlier experiments without the silver interlayer. However, the total interface ASR, which is ~1000 Ωcm2 is (i) nearly an order of magnitude lower than in experiments without silver, and (ii) remains reasonably consistent for all specimens; it was highly variable, changing over two orders of magnitude, without the Ag interlayer, as described in Table I. It is noted that the interface ASR is for two interfaces; therefore for a single interface the value is ~500 Ω cm2.

TABLE I

Summary of results from impedance measurements

|  | w/o Ag-coating | w/ Ag-coating |
| --- | --- | --- |
| ASR LLZO (Ω cm$^2$) | ~130 | ~130 |
| ASR Li-LLZO interface (Ω cm$^2$) | 500 to 100,000 | ~1,000 |

Figure 7:
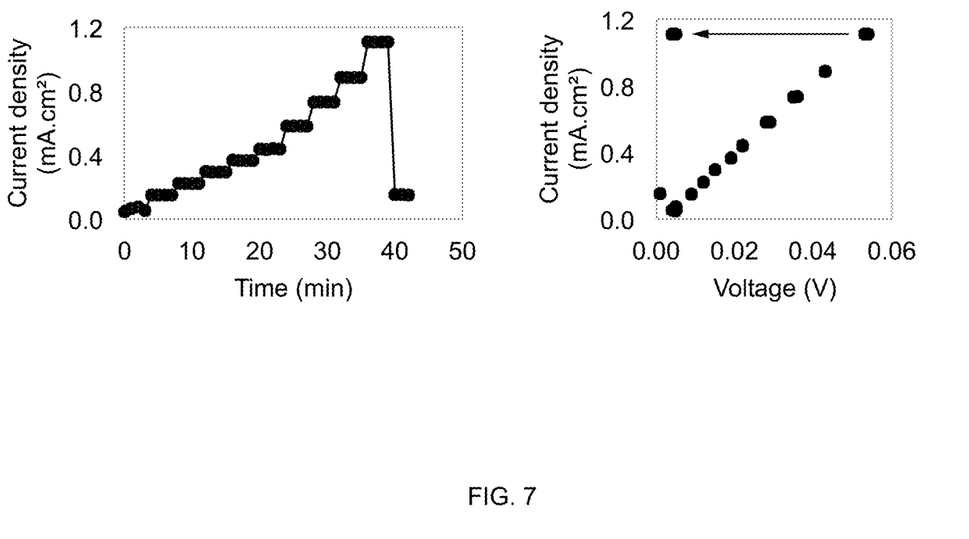
FIG. 7 illustrates typical DC current and voltage results at elevated temperature in accordance with at least one embodiment of the disclosure.
Figure 8:
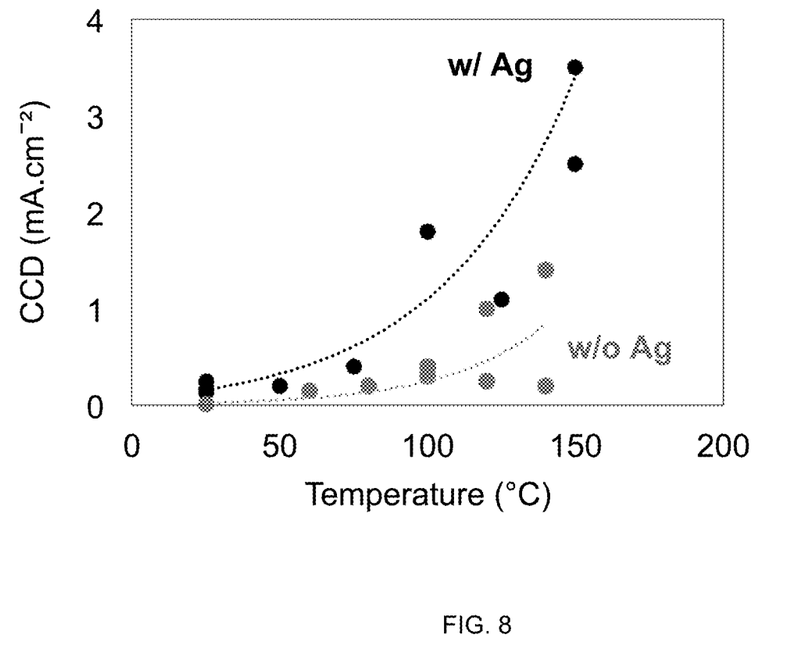
FIG. 8 illustrates measurements of the critical current density as a function of cell temperature in accordance with at least one embodiment of the disclosure. The data without the Ag layer are from a reference.

The DC behavior of the cells was measured in two ways. First, the critical current density (CCD) was measured by increasing the current stepwise, as shown in FIG. 7 until the voltage dropped to zero or near zero. The CCD was measured from room temperature up to 150° C. These results are shown in FIG. 8, which illustrates a comparison of the present measurements with the earlier measurements without the silver interlayer. Although the variability in CCD remains, the values with the interlayer are higher than without the silver interlayer. For example, at 150° C. the CCD increases from 1.4 mA cm-2 to 3.5 mA cm-2.

Figure 9:
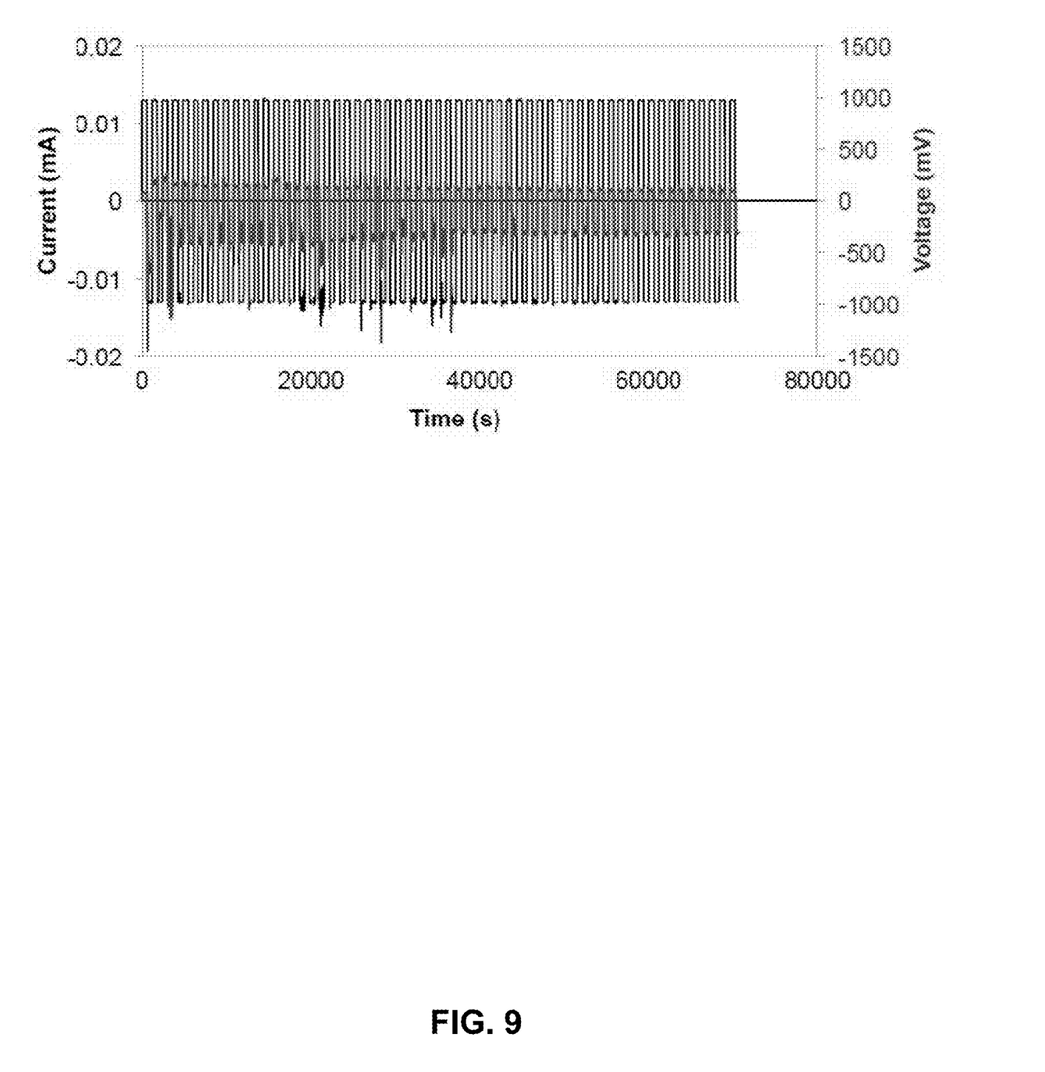
FIG. 9 illustrates cyclic behavior of a silver-coated LLZO with Li electrodes under an ±0.1 mA·cm-2 with 10 min dwell time in accordance with at least one embodiment of the disclosure.

Lithium plating and stripping was performed by cycling a cell in DC under an applied current density of ±0.1 mA·cm$^2$ with 10 min dwell time, corresponding to a cycling depth of 0.017 mAh·cm$^2$ per cycle. No short-circuiting was observed during 58 cycles as shown in FIG. 9. The noisy voltage response with spikes is possibly due to dynamic interfacial contact area or intermittent disruption of the continuous electronic conduction path caused by the rapid lithium plating and stripping or the non-uniformity of the electrolyte-electrodes interface. The total ASR calculated from the voltage response was about 1,000 Ωcm$_2$ at the positive electrode as expected from AC measurements and about 3,000 Ωcm$^2$ at the negative electrode. This asymmetry is possibly due to an asymmetric electrolyte-electrodes interface.

Figure 10:
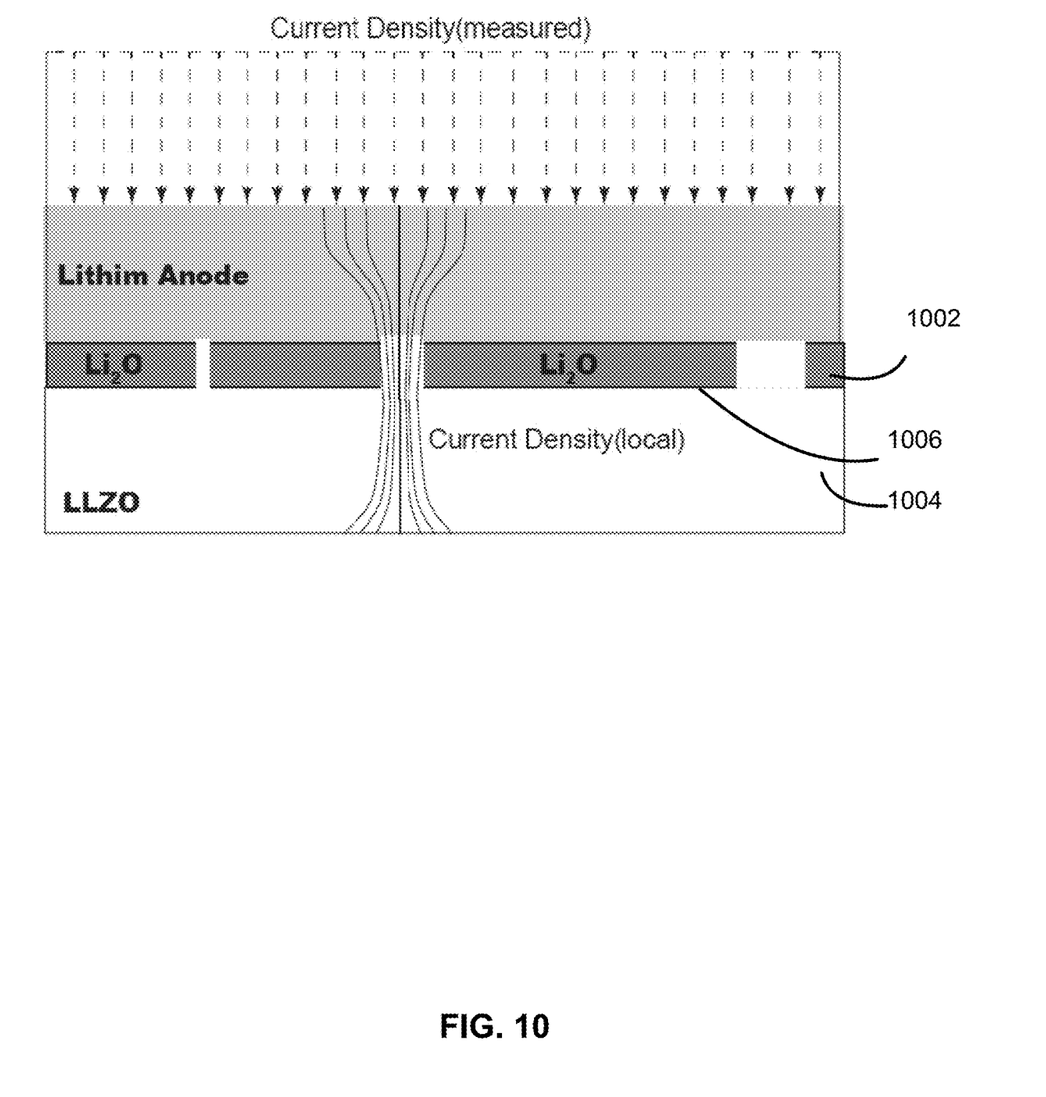
FIG. 10 illustrates a possible mechanism for high interfacial resistance and poor critical current density at Li|LLZO|Li cells.

Interface ASR values can be highly variable. It is likely that the variability of values of the interface resistance can lead to concentration of current density, which can precipitate failure. A possible mechanism is shown in FIG. 10, where an oxide 1002 forms discontinuously on a LLZO 1004 surface 1006 causing a concentration in the current. Another possible reason is that lithium escapes from the surface, leaving behind a composition and pores which are poor conductors of lithium ions.

The influence of a metal (e.g., silver) interlayer, produced by the flash sintering method, is quite remarkable. It has the following benefits, (i) it reduces the interfacial ASR by one order of magnitude, (ii) it increases the critical current density, and most importantly, (iii) it imparts stability to plating-stripping cycles of lithium.

Note that in the illustrative examples, the bead of silver does not spread into a layer of uniform thickness, but rather serves as the source of silver atoms that travel over the surface as an ultrathin layer. It is possible that in this way it disrupts the bonding of Li2O to the LLZO surface, and forms a continuous film underneath the lithium metal over the interface. The variability in the CCD persists even though the values are higher than without the silver interlayer.

The transport of lithium from the anode layer to the electrolyte is likely to be controlled by its diffusion through silver. It is likely that the interface ASR is controlled by this diffusion.

Although exemplary embodiments of the present disclosure are set forth herein, it should be appreciated that the disclosure is not so limited. For example, although exemplary sintered compounds are described in connection with various specific starting compounds, the disclosure is not necessarily limited to these examples. Various modifications, variations, and enhancements of the methods set forth herein may be made without departing from the spirit and scope of the present disclosure.

The subject matter of the present disclosure includes all novel and nonobvious combinations and subcombinations of the various systems, components, and configurations, and other features, functions, acts, and/or properties disclosed herein, as well as any and all equivalents thereof.

We claim:

1. A method of forming a structure comprising a metal layer, the method comprising the steps of:
   providing a ceramic material;
   depositing a layer of metal on a top surface of the ceramic material to form a coated ceramic material; and
   exposing the coated ceramic material to a flash sintering process to reduce a contact angle between metal of the layer of metal on the top surface of the ceramic material to thereby cause the metal to spread on the ceramic material between electrodes used during the flash sintering and form the structure comprising the metal layer on the top surface,
   wherein the flash sintering process comprises applying a voltage across the ceramic material to form an electric field, and
   wherein a thickness of the layer of metal is about one monolayer to about 5 micrometers.

2. The method of claim 1, wherein the ceramic material comprises lithium.

3. The method of claim 1, wherein the ceramic material comprises lithium lanthanum zirconium oxide.

4. The method of claim 1, wherein the ceramic material comprises $Li_7La_3Zr_2O_{12}$.

5. The method of claim 1, wherein the metal comprises one or more of silver and tin.

6. The method of claim 1, wherein the metal layer is continuous.

7. The method of claim 1, wherein the step of depositing a layer of metal comprises application of metal beads or sputtering.

8. The method of claim 1, wherein the electric field applied during the step of exposing is between about 10 V/cm and about 1000 V/cm.

9. The method of claim 1, further comprising a step of supplying controlled current.

10. The method of claim 1, wherein the flash sintering process includes increasing a temperature during the step of exposing at a rate of between about 1° C./minute and about 100° C./minute.

11. The method of claim 1, wherein the flash sintering occurs at a temperature of about 300° C. and about 1000° C.

12. The method of claim 1, further comprising a step of forming an electrochemical cell using the metal layer.

13. The method of claim 1, further comprising a step of forming a battery using the metal layer.

* * * * *